US012564891B2

(12) United States Patent
Bonte et al.

(10) Patent No.: US 12,564,891 B2
(45) Date of Patent: Mar. 3, 2026

(54) SPIN-SAW MACHINE

(71) Applicant: SMO bvba, Eeklo (BE)

(72) Inventors: Jan Bonte, Eeklo (BE); Arne Drabbé, Eeklo (BE); Guylian Cacquaert, Eeklo (BE)

(73) Assignee: SMO bvba, Eeklo (BE)

( * ) Notice: Subject to any disclaimer, the term of this patent is extended or adjusted under 35 U.S.C. 154(b) by 362 days.

(21) Appl. No.: 18/069,578

(22) Filed: Dec. 21, 2022

(65) Prior Publication Data

US 2023/0201937 A1 Jun. 29, 2023

(30) Foreign Application Priority Data

Dec. 24, 2021 (BE) .................................. 2021/6058

(51) Int. Cl.
B23D 57/00 (2006.01)
(52) U.S. Cl.
CPC ..... B23D 57/0007 (2013.01); B23D 57/0069 (2013.01); *B23D 57/0038* (2013.01); *B23D 57/0053* (2013.01); *B23D 57/0061* (2013.01)
(58) Field of Classification Search
CPC ............ B23D 57/0084; B23D 57/0069; B23D 57/0007; B23D 57/0053; B23D 57/0061; B23D 57/0038
USPC ....................................................... 83/200.1
See application file for complete search history.

(56) References Cited

U.S. PATENT DOCUMENTS

| | | | | |
|---|---|---|---|---|
| 6,267,037 B1 * | 7/2001 | McCoy, Jr. | ........ | B23D 57/0084 |
| | | | | 83/810 |
| 8,695,472 B2 | 4/2014 | Matteucci | | |
| 9,919,370 B1 * | 3/2018 | Clark | ...................... | F16L 1/166 |
| 2010/0186564 A1 * | 7/2010 | Pierce | .................. | B23D 59/001 |
| | | | | 83/72 |
| 2012/0117959 A1 * | 5/2012 | Lewkoski | ............... | F15B 11/16 |
| | | | | 60/431 |
| 2015/0027287 A1 * | 1/2015 | Harper | ............... | B23D 57/0084 |
| | | | | 83/651.1 |
| 2020/0180052 A1 * | 6/2020 | Pierce | .................. | B23D 57/003 |
| 2021/0039178 A1 | 2/2021 | Ramfjord | | |

FOREIGN PATENT DOCUMENTS

| | | | | | |
|---|---|---|---|---|---|
| AT | 522864 A1 * | 2/2021 | | ........ | B23D 57/0053 |
| CN | 113414879 A | 9/2021 | | | |
| EP | 2946864 A1 * | 11/2015 | | .......... | B25J 15/0019 |
| EP | 3153265 A1 | 4/2017 | | | |
| WO | WO-2018029607 A1 * | 2/2018 | | ............. | B23D 61/00 |

OTHER PUBLICATIONS

AT-522864-A1, Translation (Year: 2025).*

* cited by examiner

*Primary Examiner* — Nhat Chieu Q Do
(74) *Attorney, Agent, or Firm* — Vorys, Sater, Seymour and Pease LLP

(57) ABSTRACT

An overhead sawing device comprising a central frame, a cutting cable, a driving unit, a first and a second arms configured to deflect the cutting cable to a lower level, at least two rotatable arms configured to receive the cutting cable from the higher level and to guide said cable during a cut. The device further includes a telescopic cable tensioning element. A method of operating the device is also provided, which method permits the execution of a continuous cut without repositioning the device, even in confined spaces.

13 Claims, 6 Drawing Sheets

SPIN-SAW MACHINE

FIELD OF THE INVENTION

The present invention relates to a device for sawing large sized built up structures. In particular, the present invention relates to a device for sawing large sized structures using a filament sawing element.

BACKGROUND

Devices for the sawing of structures are known form prior art. EP3153265 discloses a system for guiding a cutting device around the wall of a high upright object having a cylindrical shape. The system herein comprises a ring which can be placed around the object to be sawn, wherein clamping elements fasten the ring to the casing of the object. WO2000078491 discloses a pipe cutting device. The device is suitable for use under water for cutting pipelines. The device comprises a telescopic frame which can be placed over the wall of the pipe. The device further comprises a sawing device pivotally coupled to one side of the telescopic frame. In this case, the sawing device can be pushed down into the pipe, wherein the sawing device can be rotated around the telescopic frame in order to be able to cut through the wall of the pipe through 360°. WO2011018396 discloses a system for cutting structural elements such as pipes, support pillars, etc. The system comprises a cutting wire guided around a plurality of pulleys provided on a frame, which is placed around the object to be sawn. The frame further comprises two legs provided parallel to each other, wherein the object to be sawn can be placed between the legs. Several pulleys can move along the two legs, pushing the cutting wire through the object to be sawn. In this system, the cutting wire drive is mounted in the frame around the object to be sawn. The main limitation common to all these systems is that they require too much space around the structure/object to be cut, therefore rendering such systems inadequate for use in confined spaces.

WO2019151874 discloses a system for cutting a wall. The system herein comprises a main saw device placed on an inner part of the wall, which can move around the wall by means of rails. In addition, the system further comprises an additional sawing device which can move around the outer part of the wall by means of rails attached to the outer part of the wall. The wall is sawn by means of a cutting wire which is driven by the main sawing device through a pre-drilled opening to the auxiliary sawing device. The main disadvantage of this system is the need to access the inside of the object/structure to be cut in order to pass a cutting cable.

The aim of the invention is to provide a method which eliminates those disadvantages. The invention thereto aims to provide a device for the cutting of structures, which device can be used in confined spaces and from the outside of the object/structure to be cut.

SUMMARY OF THE INVENTION

The present invention and embodiments thereof serve to provide a solution to one or more of above-mentioned disadvantages. To this end, the present invention relates to overhead sawing device according to claim 1. Preferred embodiments of the device are shown in any of the claims 2 to 9.

In a second aspect, the present invention relates to a method according to claim 10. More particular, the method herein relates to the use of the device for the cutting of objects/structures. Preferred embodiments of the method are shown in any of the claims 11 and 12.

DESCRIPTION OF FIGURES

The following description of the figures of specific embodiments of the invention is merely exemplary in nature and is not intended to limit the present teachings, their application or uses. Throughout the drawings, corresponding reference numerals indicate like or corresponding parts and features.

DETAILED DESCRIPTION OF THE INVENTION

Figure 1:
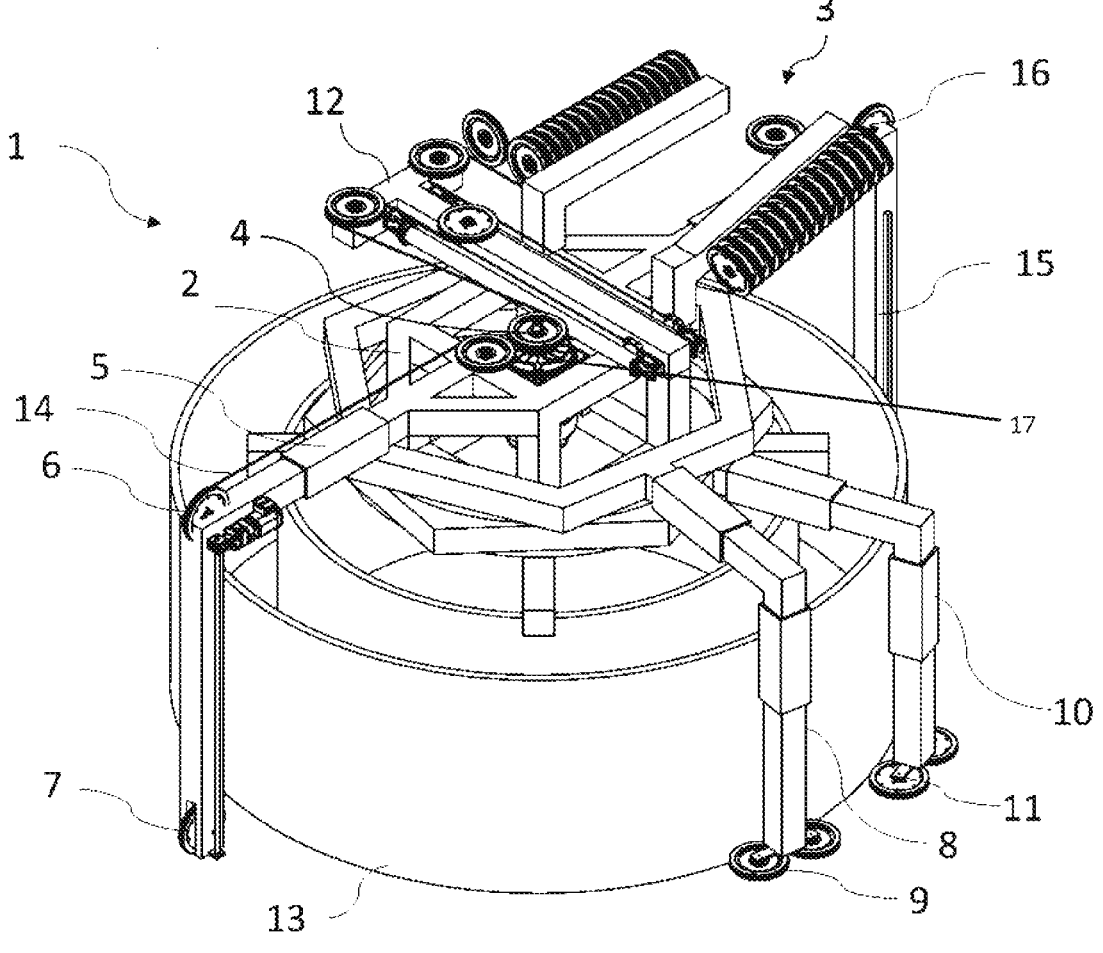
FIG. 1 shows an axonometric view of the overhead sawing device placed on a structure to be cut.

The present invention concerns an overhead sawing device.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In a first aspect, the invention provides an overhead sawing device comprising:

a. A central frame further comprising a substantially horizontal bottom level and a substantially horizontal top level connected by a plurality of substantially vertical elements;

b. Cutting cable stored in a cable storage mounted on the top level of the central frame, said cable storage having a first row of axially aligned pulleys and a second row of axially aligned pulleys placed opposite to the first row;

c. A driving unit rigidly attached to the top level of the central frame, said driving unit comprising a horizontal pulley driven by a motor, said driving unit being configured to receive and move the cutting cable towards other elements of the device;

d. A first arm having a first horizontal section radially extending from the top level of the central frame, said first arm further comprising a second vertical section extending downwards from the distal end of the first section, the first arm is further equipped with a first deflecting pulley at the end of said first section and a second pulley at the distal end of the second section;

e. A second arm having a first horizontal section radially extending from the top level of the central frame and in a direction opposite to that of the first arm, said second arm further comprising a second vertical section extending downwards from the distal end of said first section, the second arm is further equipped with a first deflecting pulley at the end of said first section and a second pulley at the distal end of the second section;

f. At least two rotatable arms, each rotatable arm radially extending from a base rotatably attached to the central frame, each of which bases being located between the top level and the bottom levels of said central frame;

g. A telescopic cable tensioning element mounted on the top level of the central frame and adjacent to the cable storage;

Each of the at least two rotatable arms further comprises a second vertical section extending downwards from the first radially extending section, the distal end of said second section being further equipped with at least two horizontal pulleys. Preferably, all but the pulley of the drive unit are free running. In this way resistance and control complexity are advantageously reduced.

In a preferred embodiment of the invention, the second pulleys of the first arm and the second arm are pivotable. This advantageously permits passing/receiving the cutting cable to/from the horizontal pulleys of each rotatable arm with minimal resistance and risk of dislodging the cutting cable.

In a further or another embodiment, the first arm and second arm are horizontally adjustable in length. In this way, the first and second arms are advantageously able to clear the perimeter of the structure to be cut. This allows for the first and second arms to pass/receive cutting cable to/from the horizontal pulleys of the rotatable arms without said cable touching the structure to be cut other than between the pullers of the two rotatable arms. In this way, excessive friction is advantageously avoided, allowing for a better and more efficient cutting action between the pulleys of the rotatable arms.

In a further or another embodiment, all rotatable legs are horizontally adjustable in length. This allows the rotatable arms to clear the perimeter of the structure to be cut, which permits an unhindered movement of the rotatable arms during the cutting operation. By preference the range of horizontal adjustment of the first and second arms is larger than that of the horizontal range of adjustment of the rotatable arms. In this way, the first and second arms can be adjusted so as to distance themselves from the perimeter of the structure to be cut such that a sufficient gap is advantageously created for the movement of the rotatable arms during the cutting operation.

According to a further or another embodiment, all rotatable legs are adjustable in height. By preference, all arms are adjustable in height. In this way, the device can cut sections of varying sizes from a structure to be cut. This is particularly advantageous in situations where the structure to be cut comprises different perimeters at different heights.

According to a further or another embodiment, the distance between the first row of pulleys and the second row of pulleys of the cable storage is adjustable. By preference, one of the rows of pulley is mounted displaceably along one direction in relation to the first package. More preferably, both rows of pulleys are mounted displaceably along one direction in relation to one another. In this way, the length of the cutting cable provided to all other elements of the device is varied by displacing one or both rows of pulleys of the cable storage relative to each other.

In a further or another embodiment, the axis of the first row of pulleys in the cable storage define an angle with the axis of the second row of pulleys of the cable storage. This permits a better transfer of the cutting cable between the pulleys in the first row to the pulleys in the second row and back. In this way, the risk of the cutting cable jumping out of a groove of a pulley of the cable storage is greatly reduced. Furthermore, the angle define by the axes of the two rows of pulleys advantageously reduces the tensions that would otherwise result in an uneven bearing of the pulleys on their respective axis.

In a further or another embodiment, the telescopic cable tensioning element comprises a first longitudinal element slidably connected to a second longitudinal element, which first longitudinal element comprises a first and a third horizontal pulleys, which pulleys are longitudinally displaceable relative to a second horizontal pulley on the second longitudinal element. This cable tensioning element permits regulating the tension on the cable before and during cutting. This advantageously permits regulating the slack in the cable, thereby preventing said cable from experiencing excessive force spikes which could otherwise result in the weakening or even breakage of the cable. Proper cable tensioning has also the advantage of preventing undesired wear patterns on the cutting elements of the cable.

In a further or another embodiment, the first and the second longitudinal elements of the telescopic cable tensioning element are movable relative to each other by means of at least one actuator. By preference, the at least one actuator is in communication with a controller. In this way, tension on the cable can be monitored and automatically adjusted for better cut performance, safety and reduced stress on the device.

Another aspect of the invention relates to a method of cutting a structure using the device of any claim 1 to claim 9 comprising the steps of:
- a. Adjusting the length of the arms of the device to the dimensions of the structure to be cut;
- b. Positioning the sawing device on top of the structure to be cut;
- c. Attaching the machine to the structure to be cut;
- d. Starting with cutting;
- e. Finishing cutting;
- f. Removal of the sawing machine; and
- g. Removal of the section cut from the structure.

In this way, the device can be placed and operated while requiring a minimal amount of space around the object/structure to be cut. This advantageously permits operating the device even is very confined spaces.

By preference, starting the cutting includes the steps of:
- a. Bringing the rotatable arms close together as far as possible from the first and second arms;
- b. Starting the driving unit;
- c. Moving the rotatable arms farther from each other as the cut progresses towards the diameter line of the structure.

In this way, the cut is initiated at the outer perimeter of the object/structure. This advantageously avoids the need to first insert the cable into predrilled holes in the object/structure or the need to access the inside of the object/structure in order to pass the cable. Furthermore, with methods where the cable is first inserted into predrilled holes in the object/structure, the kerf created by the cable does not immediately reach an orientation where the cable is under minimal tension. By starting the cable near the outer perimeter of the object/structure, the kerf created by the cable is already aligned with the path of the cable. In this way, no undue tension is imposed upon the cutting cable.

In this context kerf is to be understood as the slit created by a saw. In this case, kerf is to be understood as the slit cut on the object/structure by the cutting cable.

By preference, finishing the cutting includes the steps of:
- a. Advancing the cut beyond the diameter line of the structure;
- b. Bringing the rotatable arms closer together until the cutting cable has cleared the perimeter of the structure;
- c. Stopping the drive unit.

In this way the device can perform a cut from start to finish without repositioning of the device. This advantageously avoids any need to align multiple cuts, the extra work and time such operation would entail, as well as, time lost to the repositioning of the machine.

However, it is obvious that the invention is not limited to this application. The method according to the invention can be applied to all sorts of objects or structures that are either unmovable or suitable to be unmovable, as the concept is readily scalable.

The invention is further described by the following non-limiting examples which further illustrate the invention, and are not intended to, nor should they be interpreted to, limit the scope of the invention.

EXAMPLES AND/OR DESCRIPTION OF FIGURES

With as a goal illustrating better the properties of the invention the following presents, as an example and limiting in no way other potential applications, a description of an embodiment of the device and an example of its use based on the invention, wherein:

FIG. 1 shows an axonometric view of the overhead sawing device 1 placed on a structure to be cut 13. A central frame 2 is shown supporting a cable storage 3, a drive unit 4 and a tensioning element 12. A first arm 5 is shown extending from the central frame 2, said first arm 5 further comprising a deflecting pulley 6 and a pivoting pulley 7 directing a cutting cable 14 to a lower level and in substantial horizontal alignment with a first set of horizontal pulleys 9 of a first rotatable arm 8. Said first set of horizontal pulleys 9 is shown in horizontal alignment with a second set of horizontal pulleys 11 at the distal end of a second rotatable arm 10. A second arm 15 comprising a second deflection pulley 16 and a pivoting pulley (not shown), said second arm 15 being shown extending from the central frame 2 and opposite to the first arm 5.

Figure 2:
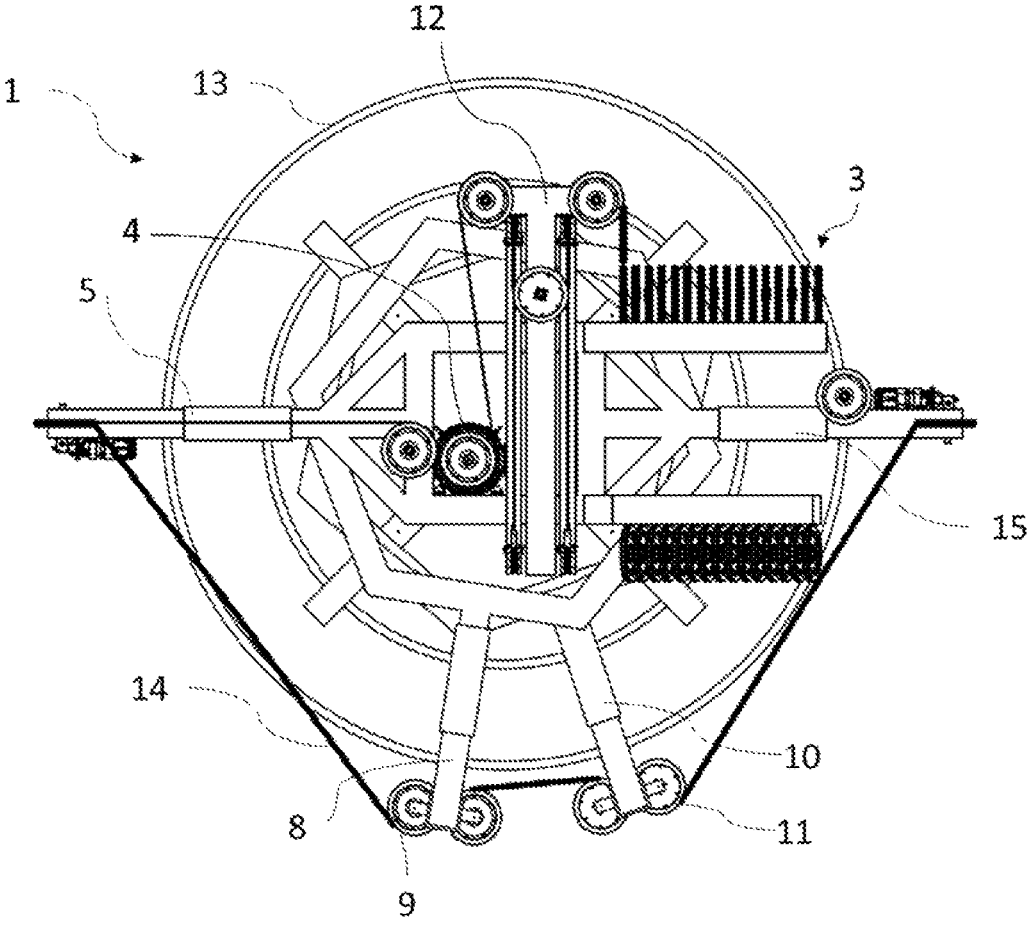
FIG. 2 shows a top view of the overhead sawing device before staring the cut.

FIG. 2 shows a top view of the overhead sawing device 1 before staring the cut. Cutting cable 14 is shown departing the drive unit 4 and traversing the first arm 5 and being deflected towards the first set of horizontal pulleys 9 of the first rotatable arm 8. Said cable being further directed towards the second set of horizontal pulleys 11 of the second rotatable arm 10. Said first rotatable arm 8 and said second rotatable arm 10 being shown in close proximity to one another and distanced as far as possible from the first arm 5 and the second arm 15. In this figure, the cable between the first rotatable arm 8 and said second rotatable arm 10 is shown outside of the perimeter of the structure to be cut 13. The cutting cable 14 is shown continuing to the second arm 15 and redirected towards the cable storage 3, followed by the tensioning unit 12 and then reaching the drive unit 4.

Figure 3:
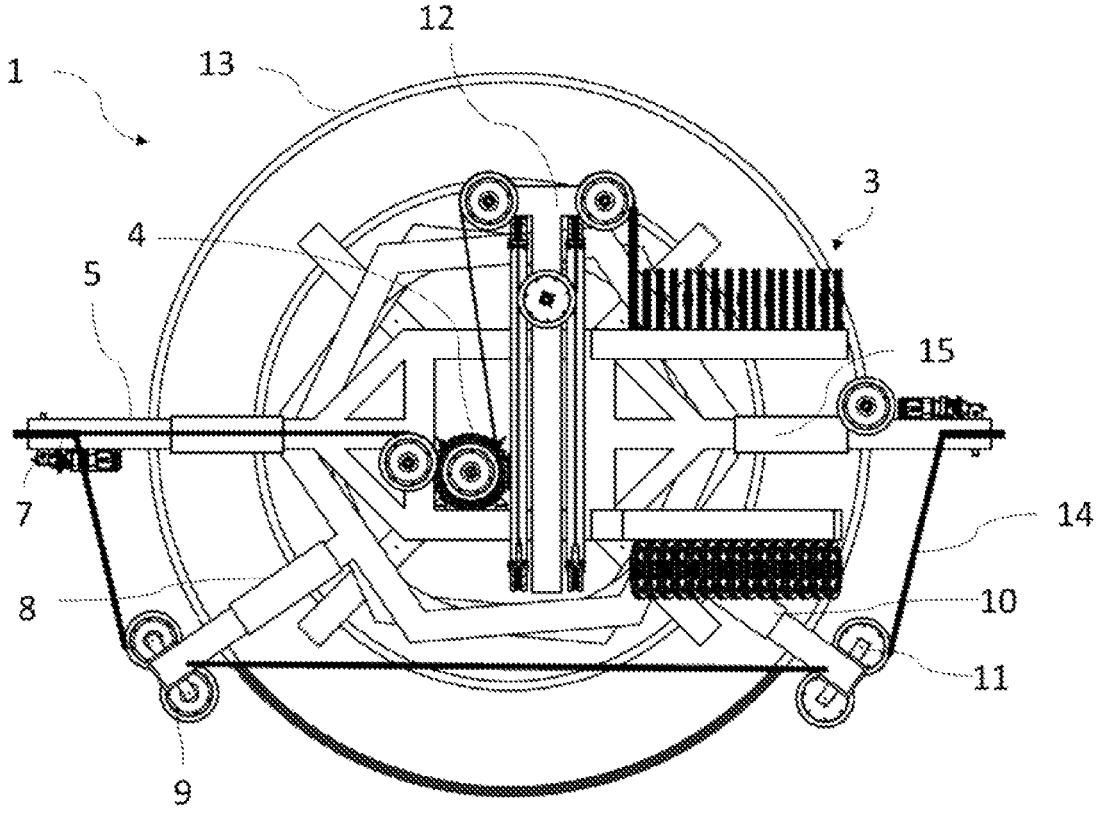
FIG. 3 shows a top view of the overhead sawing device at a quarter of the cutting progress.

FIG. 3 shows a top view of the overhead sawing device 1 at a quarter of the cutting progress. Cutting cable 14 is shown departing the drive unit 4 and traversing the first arm 5 and being deflected towards the first set of horizontal pulleys 9 of the first rotatable arm 8. Said cable being further directed towards the second set of horizontal pulleys 11 of the second rotatable arm 10. Said first rotatable arm 8 and said second rotatable arm 10 being shown farther apart from one another and moving towards the axis defined by the first arm 5 and the second arm 15. In this figure, the cable between the first rotatable arm 8 and said second rotatable arm 10 is shown traversing the structure to be cut 13 such that a chord is defined. The cutting cable 14 is shown continuing to the second arm 15 and redirected towards the cable storage 3, followed by the tensioning unit 12 and then reaching the drive unit 4.

Figure 4:
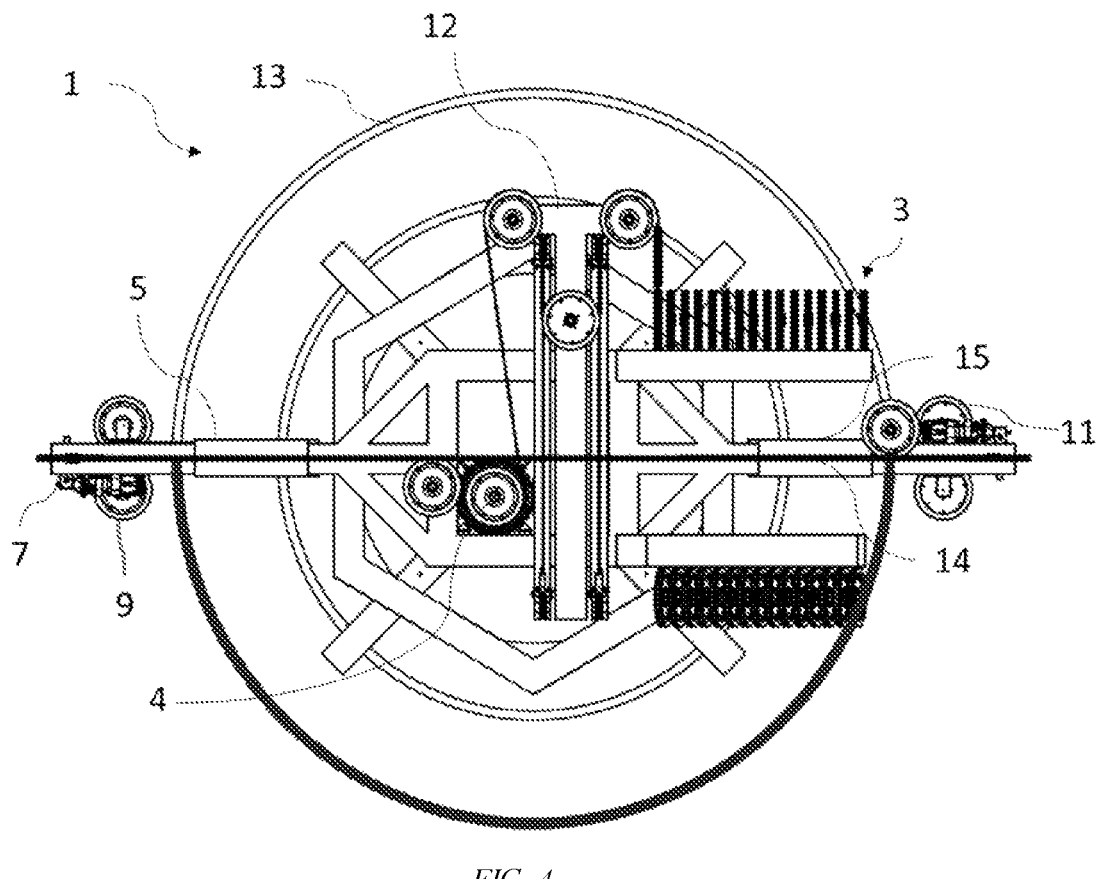
FIG. 4 shows a top view of the overhead sawing device half-way through the cut.

FIG. 4 shows a top view of the overhead sawing device 1 half-way through the cut. Cutting cable 14 is shown departing the drive unit 4 and traversing the first arm 5 and being deflected towards the first set of horizontal pulleys 9 of the first rotatable arm 8. Said cable being further directed towards the second set of horizontal pulleys 11 of the second rotatable arm 10. Said first rotatable arm 8 being shown in alignment with the first arm 5. Said second rotatable arm 10 being shown aligned with the second arm 15. In this figure, the cable between the first rotatable arm 8 and said second rotatable arm 10 is shown traversing the diameter of structure to be cut 13. The cutting cable 14 is shown continuing to the second arm 15 and redirected towards the cable storage 3, followed by the tensioning unit 12 and then reaching the drive unit 4.

Figure 5:
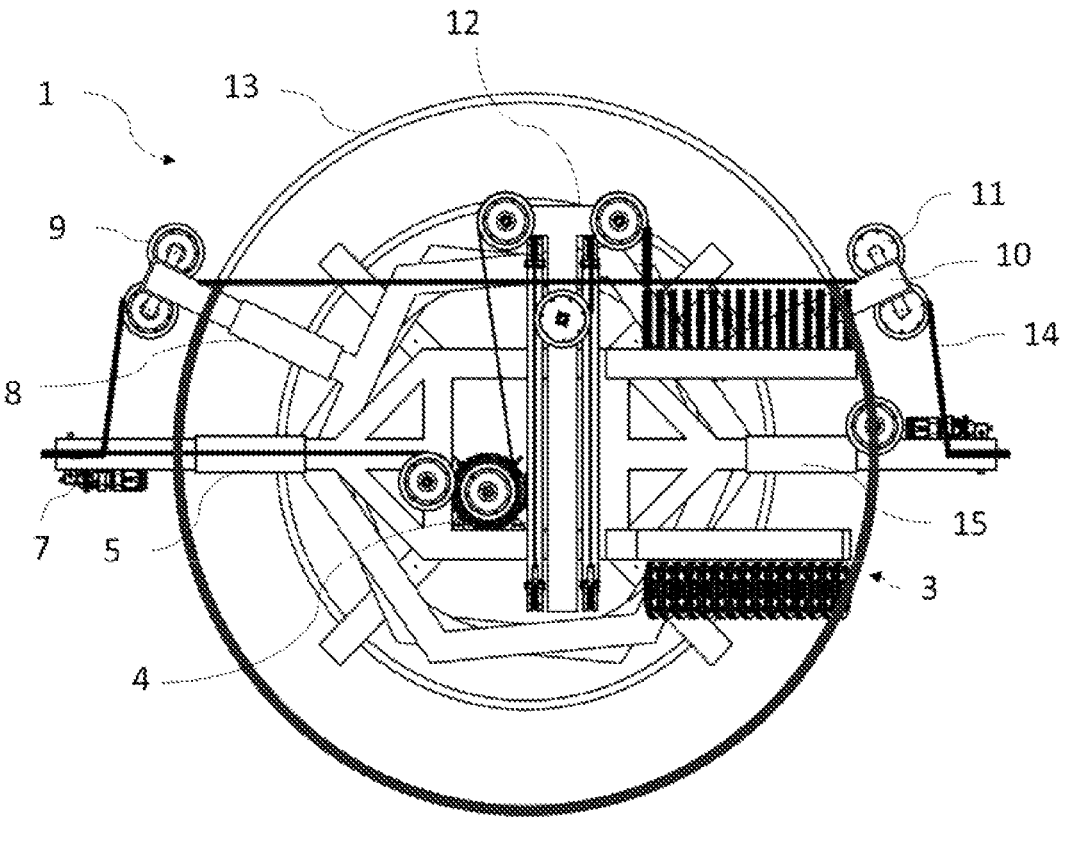
FIG. 5 shows a top view of the overhead sawing device at three quarters of the cutting process.

FIG. 5 shows a top view of the overhead sawing device 1 at three quarters of the cutting process. Cutting cable 14 is shown departing the drive unit 4 and traversing the first arm 5 and being deflected towards the first set of horizontal pulleys 9 of the first rotatable arm 8. Said cable being further directed towards the second set of horizontal pulleys 11 of the second rotatable arm 10. Said first rotatable arm 8 and said second rotatable arm 10 being shown moving towards one another. In this figure, the cable between the first rotatable arm 8 and said second rotatable arm 10 is shown traversing the structure to be cut 13 such that a chord is defined. The cutting cable 14 is shown continuing to the second arm 15 and redirected towards the cable storage 3, followed by the tensioning unit 12 and then reaching the drive unit 4

Figure 6:
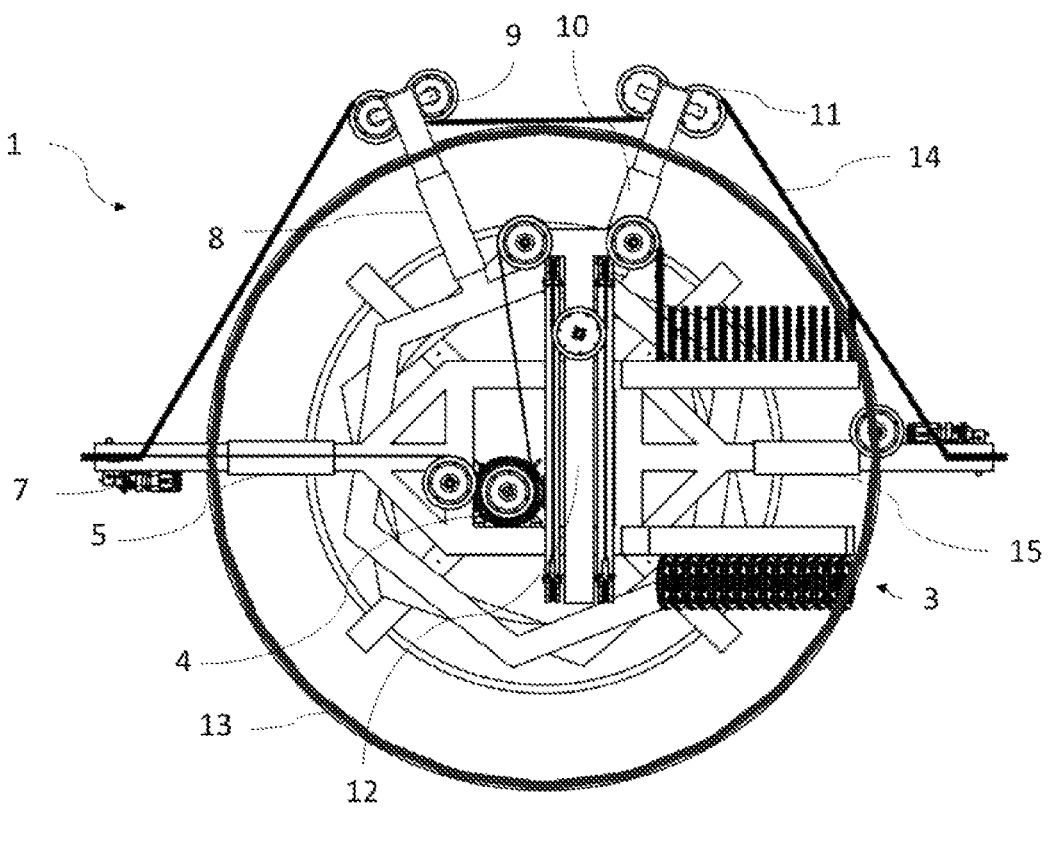
FIG. 6 shows a top view of the overhead sawing device with a finished cut.

FIG. 6 shows a top view of the overhead sawing device with a finished cut. Cutting cable 14 is shown departing the drive unit 4 and traversing the first arm 5 and being deflected towards the first set of horizontal pulleys 9 of the first rotatable arm 8. Said cable being further directed towards the second set of horizontal pulleys 11 of the second rotatable arm 10. Said first rotatable arm 8 and said second rotatable arm 10 being shown in close proximity to one another and distanced as far as possible from the first arm 5 and the second arm 15. In this figure, the cable between the first rotatable arm 8 and said second rotatable arm 10 is shown outside the perimeter of the structure to be cut 13, having cleared said perimeter. The cutting cable 14 is shown continuing to the second arm 15 and redirected towards the cable storage 3, followed by the tensioning unit 12 and then reaching the drive unit 4.

TABLE 1

List of Numbered Items,:

| 1 | overhead sawing device |
| 2 | central frame |
| 3 | cable storage |
| 4 | drive unit |
| 5 | first arm |
| 6 | first deflecting pulley |
| 7 | first pivoting pulley |
| 8 | first rotatable arm |
| 9 | first set of horizontal pulleys |
| 10 | second rotatable arm |
| 11 | second set of horizontal pulleys |
| 12 | tensioning element |
| 13 | structure to be cut |
| 14 | cutting cable |
| 15 | second arm |

TABLE 1-continued

List of Numbered Items,:

| 16 | second deflecting pulley |
| 17 | motor |

The present invention is in no way limited to the embodiments described in the examples and/or shown in the figures. On the contrary, methods according to the present invention may be realized in many different ways without departing from the scope of the invention.

The invention claimed is:

1. An overhead sawing device comprising:
a. a central frame further comprising a horizontal bottom level and a horizontal top level connected to the horizontal bottom level by a plurality of substantially vertical elements;
b. a cutting cable stored in a cable storage, said cable storage being mounted on the top level of the central frame, said cable storage having a first row of axially aligned pulleys and a second row of axially aligned pulleys placed opposite to the first row of axially aligned pulleys;
c. a driving unit rigidly attached to the top level of the central frame, said driving unit comprising a horizontal pulley drivable by a motor, said driving unit being configured to receive and move the cutting cable towards other elements of the overhead sawing device;
d. a first arm having a first horizontal section radially extending from the top level of the central frame, said first arm further having a second vertical section extending downwards from a distal end of the first section, the first arm is further having a first deflecting pulley at the distal end of said first section and a second pulley at a distal end of the second section;
e. a second arm having a first horizontal section radially extending from the top level of the central frame and in a direction opposite to that of the first arm, said second arm further having a second vertical section extending downwards from a distal end of said first section, the second arm is further having a first deflecting pulley at the distal end of said first section and a second pulley at a distal end of the second section;
f. at least two rotatable arms, each rotatable arm having a first radially extending section radially extending from a base rotatably attached to the central frame, each of which the bases being located between the top level and the bottom levels of said central frame; and
g. a telescopic cable tensioning element mounted on the top level of the central frame and adjacent to the cable storage;
wherein each of the at least two rotatable arms further has a second vertical section extending downwards from the first radially extending section, and wherein a distal end of each said second vertical section of the at least two rotatable arms has at least two horizontal pulleys.

2. The overhead sawing device according to claim 1, wherein the second pulley of the first arm and the second pulley of the second arm are pivotable.

3. The overhead sawing device according to claim 1, wherein the first arm and second arm are horizontally adjustable in length.

4. The overhead sawing device according to claim 1, wherein the at least two rotatable arms are horizontally adjustable in length.

5. The overhead sawing device according to claim 1, wherein the at least two rotatable arms are adjustable in height.

6. The overhead sawing device according to claim 1, wherein a distance between the first row of axially aligned pulleys and the second row of axially aligned pulleys of the cable storage is adjustable.

7. The overhead sawing device according to claim 1, wherein an axis of the first row of axially aligned pulleys in the cable storage define an angle with axis of the second row of axially aligned pulleys of the cable storage.

8. The overhead sawing device according to claim 1, wherein the telescopic cable tensioning element comprises a first longitudinal element slidably connected to a second longitudinal element, wherein the first longitudinal element comprises a first horizontal pulley and a third horizontal pulley which are longitudinally displaceable relative to a second horizontal pulley on the second longitudinal element.

9. The overhead sawing device according to claim 8, wherein the first and the second longitudinal elements of the telescopic cable tensioning element are movable relative to each other by means of at least one actuator.

10. A method of cutting a structure using the overhead sawing device of claim 1 comprising the steps of:

a. adjusting the length of the at least two rotatable arms of the overhead sawing device to dimensions of the structure;

b. positioning the overhead sawing device on top of the structure;

c. attaching the machine overhead sawing device to the structure;

d. starting with cutting;

e. finishing cutting;

f. removing the sawing machine from the structure; and g. removing a section cut from the structure.

11. The method of cutting a structure according to claim 10, wherein starting the cutting includes the steps of:

a. bringing the at least two rotatable arms close together, as far as possible from the first and second arms;

b. starting the driving unit; and c. moving the at least two rotatable arms farther from each other as the cut progresses towards a diameter line of the structure.

12. The method of cutting a structure according to claim 11, wherein finishing the cutting includes the steps of:

a. advancing the cutting cable beyond a diameter line of the structure;

b. bringing the at least two rotatable arms closer together until the cutting cable has cleared a perimeter of the structure; and c. stopping the drive unit.

13. The method of cutting a structure according to claim 10, wherein finishing the cutting includes the steps of:

a. advancing the cutting cable beyond a diameter line of the structure;

b. bringing the at least two rotatable arms closer together until the cutting cable has cleared a perimeter of the structure; and c. stopping the drive unit.

* * * * *